(12) United States Patent
Taniguchi et al.

(10) Patent No.: US 9,068,640 B2
(45) Date of Patent: Jun. 30, 2015

(54) FASTENING STRUCTURE FOR RING-GEAR AND DIFFERENTIAL CASE, AND DIFFERENTIAL DEVICE USING SAME

(75) Inventors: Makoto Taniguchi, Susono (JP); Yoshihiko Ukai, Nagoya (JP); Hirokazu Tsunekawa, Nagoya (JP); Hiroyuki Shioiri, Numazu (JP)

(73) Assignee: TOYOTA JIDOSHA KABUSHIKI KAISHA, TOYOTA (JP)

( * ) Notice: Subject to any disclaimer, the term of this patent is extended or adjusted under 35 U.S.C. 154(b) by 103 days.

(21) Appl. No.: 13/701,691

(22) PCT Filed: Jun. 4, 2010

(86) PCT No.: PCT/JP2010/059539
§ 371 (c)(1),
(2), (4) Date: Dec. 3, 2012

(87) PCT Pub. No.: WO2011/151923
PCT Pub. Date: Dec. 8, 2011

(65) Prior Publication Data
US 2013/0074648 A1 Mar. 28, 2013

(51) Int. Cl.
*F16H 57/023* (2012.01)
*F16H 48/40* (2012.01)
*F16H 48/38* (2012.01)

(52) U.S. Cl.
CPC .......... *F16H 57/023* (2013.01); *Y10T 74/2186* (2015.01); *F16H 48/40* (2013.01); *F16H 2048/382* (2013.01); *F16H 2048/385* (2013.01)

(58) Field of Classification Search
CPC ... F16H 57/023; F16H 48/40; F16H 57/0025; F16H 2048/385; F16D 1/072
USPC ................................ 74/606 R; 475/230, 331
See application file for complete search history.

(56) References Cited

U.S. PATENT DOCUMENTS

| 4,974,309 | A | | 12/1990 | Hattori et al. |
| 5,320,587 | A | * | 6/1994 | Bodtker et al. ............... 475/230 |
| 6,656,079 | B2 | * | 12/2003 | Eulenstein et al. ........... 475/331 |

(Continued)

FOREIGN PATENT DOCUMENTS

| EP | 647789 A1 | 4/1995 |
| FR | 2580349 A1 | 10/1986 |

(Continued)

OTHER PUBLICATIONS

EPO Machine translation of EP0647789, Daniel et al., Apr. 1995.*

(Continued)

*Primary Examiner* — Vinh Luong
(74) *Attorney, Agent, or Firm* — Kenyon & Kenyon LLP (57) ABSTRACT

A fastening structure for a ring-gear and a differential case comprises a differential case which is provided with: a ring gear having a gear section formed on the outer peripheral surface thereof, and a plurality of notch portions formed on the inner peripheral surface thereof; a press-fitting surface whereon the ring gear is press-fitted; and a flange section which is forced against and caulked to the notch portions, at the end of the press-fitting surface. After the ring gear has been press-fitted to the press-fitting surface, the flange section is forced toward the notch portions, and thus the differential case is caulked and fastened to the ring gear. The notch portions have stepped surfaces, and thus rattling generated during torque transmission can be suppressed.

4 Claims, 8 Drawing Sheets (56) References Cited

U.S. PATENT DOCUMENTS

| | | | |
|---|---|---|---|
| 8,015,899 B2* | 9/2011 | Gianone et al. | 74/606 R |
| 2001/0026727 A1 | 10/2001 | Okabe et al. | |
| 2005/0255960 A1 | 11/2005 | Maruyama et al. | |
| 2009/0045670 A1 | 2/2009 | Enomoto et al. | |
| 2012/0311845 A1* | 12/2012 | Taniguchi et al. | 29/522.1 |
| 2013/0035196 A1* | 2/2013 | Taniguchi et al. | 475/331 |
| 2013/0074648 A1 | 3/2013 | Taniguchi et al. | |
| 2013/0074649 A1* | 3/2013 | Taniguchi et al. | 74/606 R |
| 2013/0112026 A1* | 5/2013 | Ukai et al. | 74/434 |
| 2013/0269462 A1* | 10/2013 | Taniguchi et al. | 74/434 |

FOREIGN PATENT DOCUMENTS

| | | |
|---|---|---|
| JP | 55-075515 U | 5/1980 |
| JP | 56-102326 A | 8/1981 |
| JP | 02-075424 A | 3/1990 |
| JP | 03-052741 A | 3/1991 |
| JP | 05-001699 A | 1/1993 |
| JP | 05-076961 A | 3/1993 |
| JP | 06-014058 B | 2/1994 |
| JP | 08-135804 A | 5/1996 |
| JP | 08-226426 A | 9/1996 |
| JP | 09-239480 A | 9/1997 |
| JP | 2819930 B2 | 11/1998 |
| JP | 2001-276939 A | 10/2001 |
| JP | 2003-294114 A | 10/2003 |
| JP | 2005106183 A | 4/2005 |
| JP | 2007-221899 A | 8/2007 |

OTHER PUBLICATIONS www.merriam-webster.com/dictionary/step Oct. 15, 2014.*
Office Action mailed Sep. 30, 2014, in U.S. Appl. No. 13/808,313.
Notice of Allowance mailed Jan. 22, 2015 in U.S. Appl. No. 13/808,313.
Notice of Allowance mailed Apr. 1, 2015 in U.S. Appl. No. 13/808,313.

* cited by examiner

FASTENING STRUCTURE FOR RING-GEAR AND DIFFERENTIAL CASE, AND DIFFERENTIAL DEVICE USING SAME

CROSS-REFERENCE TO RELATED APPLICATIONS

This is a 371 national phase application of PCT/JP2010/059539 filed on 04 Jun. 2010, the entire contents of which are incorporated herein by reference.

TECHNICAL FIELD

The present invention relates to a fastening structure for ring gear and differential case, and a differential device incorporating the fastening structure.

BACKGROUND ART

A differential gear to be used in a drive mechanism of a vehicle is one of differential devices used for a shaft connecting drive wheels of the vehicle to absorb a speed difference between an inner wheel and an outer wheel when the vehicle goes around a curve.

To be brief, the differential gear includes a ring gear attached to the outside of the differential case, a pinion gear placed in and attached to the inside of the differential case, and a gear engaged with the pinion gear and mounted on an axle.

Drive power generated by an engine and others in the vehicle is transmitted to the ring gear fastened to the differential case, thereby rotating the gear mounted on the axle through the pinion gear attached to the differential case, thus transmitting the power to the axle.

As another differential device to be used in a vehicle, there is a called LSD designed to compensate defects of a differential gear that causes idling of an axle while one of the wheels is in an unloaded condition. This LSD is similar to the above differential device in that a ring gear is provided on the outside of a differential case.

A method for fastening the ring gear to the differential case in the above differential device is conventionally executed by using bolts. However, this fastening method using bolts causes problems with an increase in weight due to the weight of bolts and the thickness enough to allow the fastening using bolts.

Figure 8:
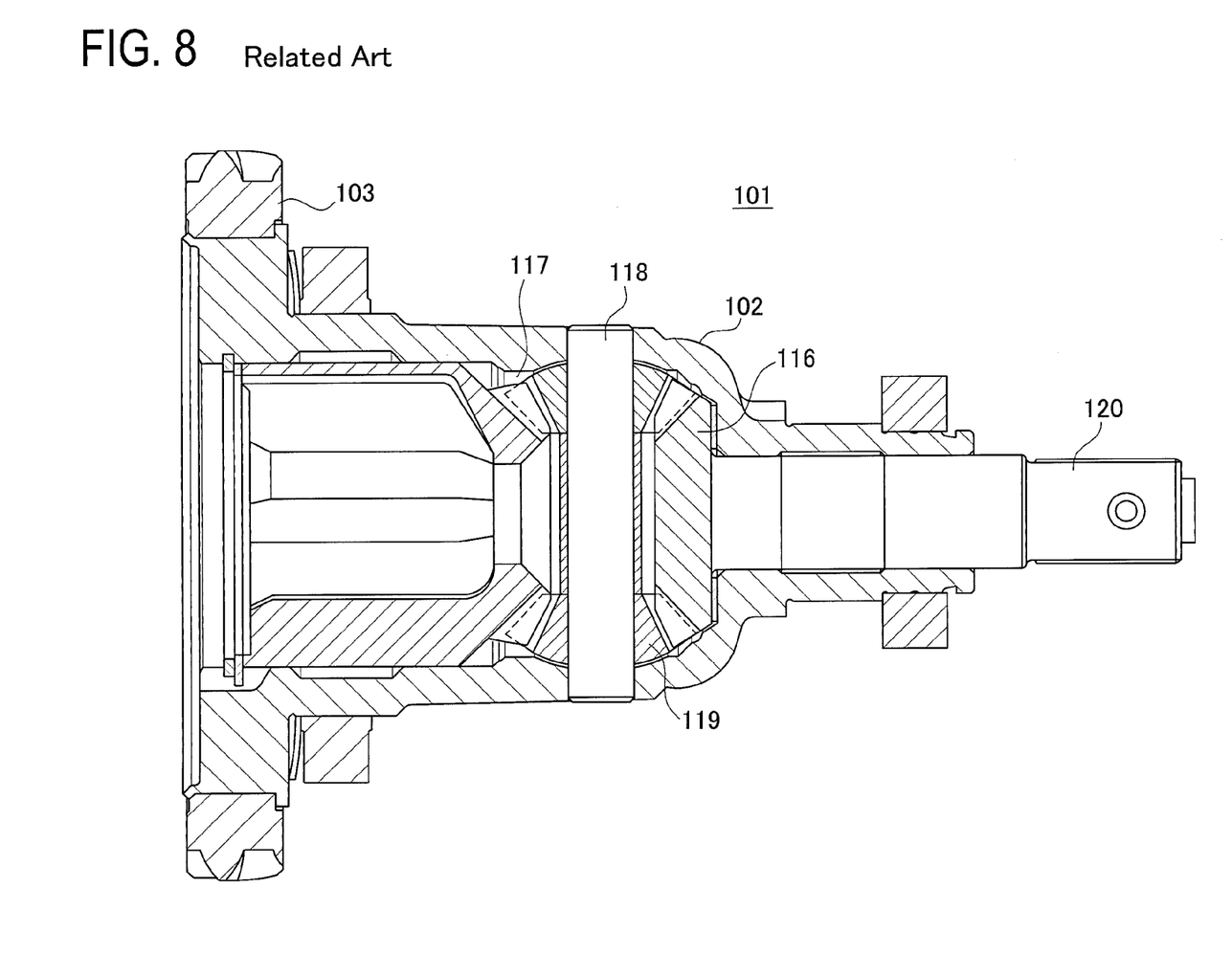
FIG. 8 is a cross sectional view of a conventional differential gear.
Figure 9:
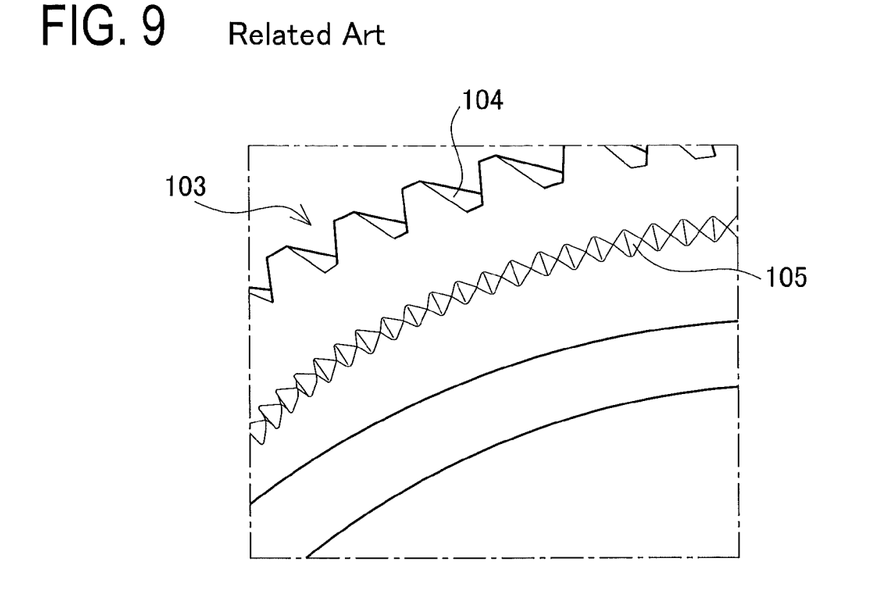
FIG. 9 is a perspective enlarged view of a part of a ring gear.
Figure 10:
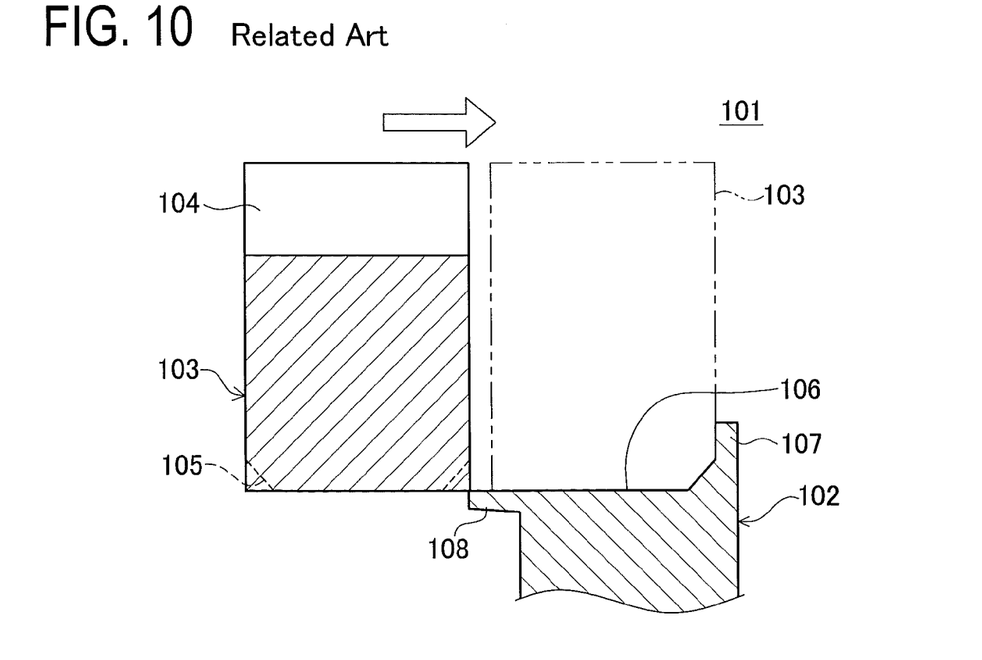
FIG. 10 is a diagram to show a process for press-fitting the ring gear onto a differential case.
Figure 11:
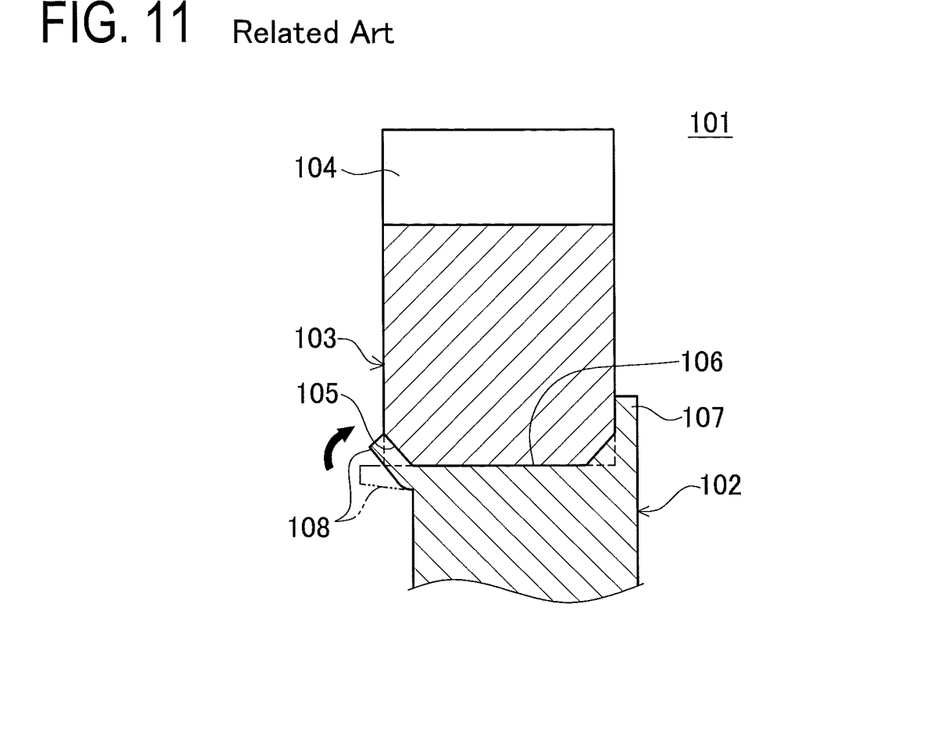
FIG. 11 is a diagram to show a process for fixing the ring gear by caulking to the differential case.
Figure 12:
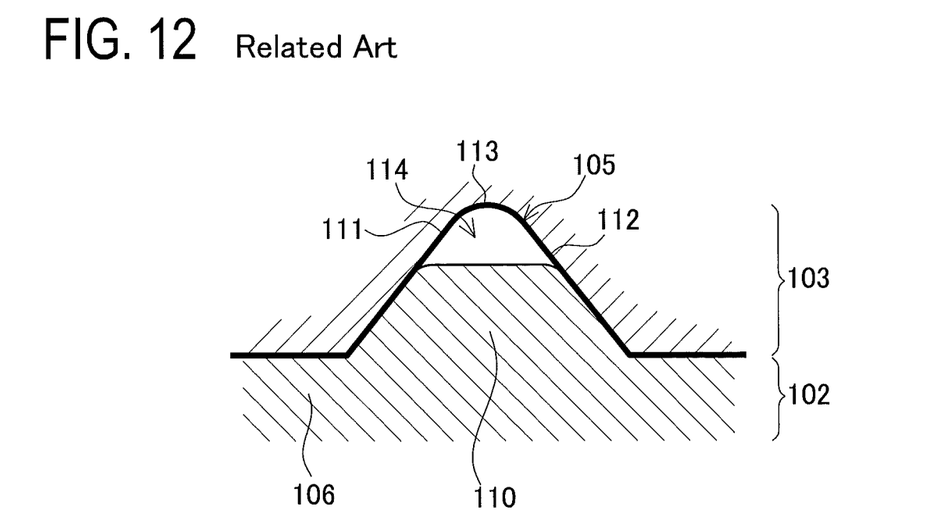
FIG. 12 is a schematic enlarged view of a caulking portion in the conventional differential gear.

Therefore, a method for fastening by caulking is also studied instead of the fastening of the differential case and the ring gear with bolts (see Patent Document 1, for example). FIG. 8 is a cross sectional view of a conventional differential gear 101. FIG. 9 is a perspective view showing an enlarged part of a ring gear 103. FIG. 10 is a diagram showing a process for press-fitting the ring gear 103 onto a differential case 102. FIG. 11 is a diagram showing a process for fixing the ring gear 103 to the differential case 102 by caulking. FIG. 12 is a schematic enlarged view showing a caulking portion of the conventional differential gear 101.

The differential gear 101 shown in FIG. 8 will be mounted in a vehicle in such a manner that the ring gear 103 engages a drive gear (not shown) for transmitting drive power to the gear 103. The differential gear 101 is configured such that when the ring gear 103 fixed to one end of the differential case 102 receives a rotational torque from the unshown drive gear, the differential case 102 is rotated together with the ring gear 103. The differential case 102 has a mounting cavity 117 in which a differential gear 116 is housed. In the differential case 102, a pinion gear 119 is fixedly placed in the cavity 117 through a pinion shaft 118 and thus disabled from rotating. The pinion gear 119 meshes with the differential gear 116 to transmit drive power to an axle 120 connected to the differential gear 116.

The ring gear 103 is fastened to the differential case 102 by press-fitting the ring gear 103 onto the outer peripheral surface of one end portion of the differential case 102 and then caulking. As shown in FIG. 9, the outer peripheral surface of the ring gear 103 is formed with a gear section 104 which will receive a rotational torque. The inner peripheral surface of the ring gear 103 is formed with a plurality of notch portions 105 continuously arranged.

As shown in FIG. 10, the outer peripheral surface of the one end portion of the differential case 102 is provided with an annular press-fit surface 106 on which the ring gear 103 is press-fitted. The press-fit surface 106 is designed with an outer diameter larger than an inner diameter of the ring gear 103 to provide a press-fit allowance (interference). On a right end face of the press-fit surface 106 in the figure, a heel portion 107 is formed vertical to the press-fit surface 106 to thereby restrict a press-fit amount of the ring gear 103. On a left end face of the press-fit surface 106 in the figure, a flange portion 108 is formed extending from the press-fit surface 106.

The above differential gear 101 is assembled in a way that the ring gear 103 is fitted onto the press-fit surface 106 from the side of the flange portion 108 of the differential case 102 as shown in FIG. 10, and the ring gear 103 is press-fitted on the press-fit surface 106 until the ring gear 103 abuts on the heel portion 107. At that time, the ring gear 103 is press-fitted on the press-fit surface 106 so that the notch portions 105 are located on the opposite side from the heel portion 107. The flange portion 108 is then folded toward and pressed against the notch portions 105 as shown in FIG. 11. Thus, the material of the flange portion 108 is made to plastically flow in each notch portion 105. Accordingly, as shown in FIG. 12, the flange portion 108 is plastically deformed so as to enter in each notch portion 105, thus forming a caulking portion 110. The ring gear 103 is thus clamped between the caulking portion 110 and a contact portion of the heel portion 107 with the ring gear 103.

RELATED ART DOCUMENTS

Patent Documents

Patent Document 1: EP Publication No. 647789 A

SUMMARY OF INVENTION

Problems to be Solved by the Invention

However, the notch portions 105 of the conventional differential gear 101 are each formed in a chevron cross section as shown in FIG. 12. Accordingly, when the flange portion 108 is to be caulked to the notch portions 105, specifically, when the flange portion 108 is pressed against the notch portions 105 to cause plastic flow of the material of the flange portion 108 into the notch portions 105 to thereby form the caulking portion 110, slant surfaces 111 and 112 of each notch portion 105 exhibit resistance to deformation. In each notch portion 105, therefore, the material of the flange portion 108 does not reach a top part 113 and thus an unfilled area 114 in which the material is not filled is created in the top part 113.

In the case where the differential gear 101 in which the differential case 102 and the ring gear 103 are fastened by caulking is installed in a vehicle, for example, a rotational torque acting on the ring gear 103 may plastically deform the caulking portion 110 and thus rattle or looseness is generated.

Figure 13:
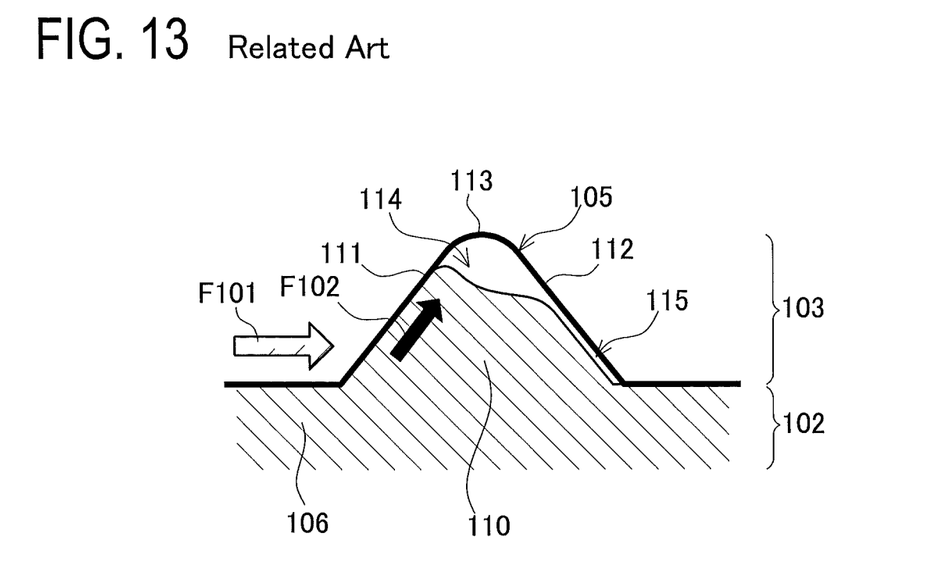
FIG. 13 is a diagram to explain a state of the conventional differential gear in which a torque in a normal direction is transmitted from the ring gear to the differential case.

To be concrete, when the vehicle runs ahead, a rotational torque in a normal direction is transmitted to the ring gear 103. Then, the ring gear 103 transmits the rotational torque to the differential case 102 through press-fit portions of the caulking portion 110 and the press-fit surface 106. At that time, as shown in FIG. 13, for example, a torque F101 acts on the slant surface 111 of the notch portion 105. Since the unfilled area 114 filled with no material is formed in the top part 113 during the caulking process, the plastic flow of the material of the caulking portion 110 in an upward direction is not restricted. Accordingly, as the torque F110 acts on the slant surface 111, the direction of the torque is changed toward the unfilled area 114 (the top part 113) as indicated by an arrow F102 in the figure, the material of the caulking portion 110 contacting the slant surface 111 plastically flows to rise upward. When the material contacting the slant surface 111 is plastically deformed upward, the notch portion 105 are moved, by just that much, in an acting direction of the torque F101 (rightward in the figure) relative to the flange portion 108, generating a gap 115 between the caulking portion 110 and the slant surface 112.

Figure 14:
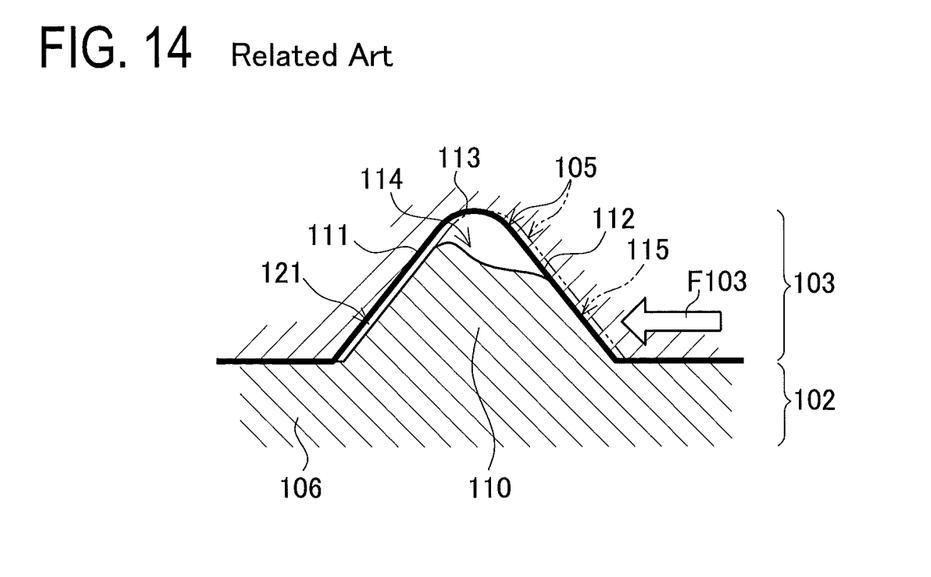
FIG. 14 is a diagram to explain a state of the conventional differential gear in which a torque in a reverse direction is transmitted from the ring gear to the differential case.

When the vehicle runs back while the gaps 115 are present, a rotational torque in a reverse direction opposite to the normal direction acts on the ring gear 103, which transmits this reverse rotational torque to the differential case 102 through the caulking portion 110 and the press-fit portion to the press-fit surface 106. In this case, as shown in FIG. 14, a torque F103 acts on the slant surface 112 of the notch portion 105. When the ring gear 103 is subjected to the reverse rotational torque while the gap 115 generated during forward running of the vehicle as described above is present between the slant surface 112 and the caulking portion 110, the notch portion 105 moves leftward in the figure from a back start position indicated by a double dashed line in FIG. 14 to bring the slant surface 112 of the notch portion 105 into contact with the caulking portion 110 as shown by a solid line in the figure to thereby eliminate the gap 115. This movement causes rattle or looseness between the differential case 102 and the ring gear 103. A gap 121 is finally generated between the slant surface 111 and the caulking portion 110.

When the rattle or looseness occurs between the differential case 102 and the ring gear 103, the ring gear 103 is displaced and the gear section 104 is disengaged from the drive gear (not shown) for transmitting drive power. In this case, a disengaged portion of the gear section 104 hits or strikes against the drive gear not shown, generating gear noise, which is undesired sound. During torque transmission, furthermore, the portion of the gear section 104 disengaged from the unshown drive gear is subjected to a biased force, and the tooth surface strength may be deteriorated.

When the rattle or looseness occurs between the differential case 102 and the ring gear 103, the press-fit surface 106 of the differential case 102 may sometimes be plastically deformed to cause sliding or slipping with respect to the gear 103. In this case, the press-fit surface 106 rubs the inner peripheral surface of the ring gear 103 and wears down, generating foreign matters. The press-fit surface 106 worn away further lowers the fastening strength to press-fit the ring gear 103 onto the press-fit surface 106 to fasten the ring gear 103 to the differential case 102 and deteriorates the durability of the differential gear 101.

FIG. 13 is a diagram to explain a state of the conventional differential gear 101, in which the torque F101 is transmitted from the ring gear 103 to the differential case 102. FIG. 14 is a diagram to explain a state of the conventional differential gear 101, in which the reverse torque F103 is transmitted from the ring gear 103 to the differential case 102.

The present invention has been made to solve the above problems and has a purpose to provide a fastening structure for ring gear and differential case, whereby the rattle or looseness generated during torque transmission can be restrained, and a differential device using the fastening structure.

Means of Solving the Problems

To achieve the above purpose, one aspect of the invention provides a fastening structure for ring gear and differential case, including: a ring gear having an outer peripheral surface formed with a gear section and an inner peripheral surface formed with a plurality of notch portions; a differential case including a press-fit surface on which the ring gear is press-fitted and a flange portion formed at an end of the press-fit surface and pressed against the notch portions, the ring gear is press-fitted on the press-fit surface and then the flange portion is pressed against the notch portions to fasten the differential case to the ring gear by caulking, wherein the notch portions each have step surfaces.

In the fastening structure for ring gear and differential case configured as above, preferably, the step surfaces of each of the notch portions are provided on both sides of a notch central line along a direction recessed from the inner peripheral surface.

In the fastening structure for ring gear and differential case configured as above, preferably, the notch portions are each formed with a recess on the step surfaces so that the recess is concave on an opposite side from the flange portion.

To achieve the above purpose, another aspect of the invention provides differential device incorporating the fastening structure for ring gear and differential case described in one of the above configurations.

Effects of the Invention

According to the fastening structure for ring gear and differential case and the differential device using the fastening structure in the above aspect, when a rotational torque is applied to the ring gear, the differential case receives the torque from the ring gear via the press-fit portion of the ring gear to the press-fit surface and the caulking portion portions of the flange portion caulked to the notch portions of the ring gear. In the ring gear, the flange portion of the differential case is caulked to the notch portions, the material of the flange portion plastically flows in the notch portions so as to touch the step surface of each notch portion, so that the plastically deformed flange portion forms the caulking portion. Accordingly, when the rotational torque is transmitted to the ring gear and the torque acts on the side surface of each notch portion, the caulking portion is pressed through the side surface and thus to be deformed. However, the caulking portion is restricted from deforming by the step surface formed in each notch portion. The force acting on the caulking portion is exerted toward the surface opposite the side surface receiving the torque. The caulking portion is also in contact with the surface opposite the torque-receiving surface. Thus, the caulking portion receives a reacting force from the surface opposite the torque-receiving surface. As a result, the caulking portion is subjected to the force close to hydrostatic pressure. Thus, the caulking portion is not deformed during torque transmission and any gaps are not generated between the notch portions and the caulking portion. According to the fastening structure for ring gear and differential case and the differential device using the fastening structure configured as above, it is possible to restrain the generation of rattle or looseness during torque transmission.

In the fastening structure for ring gear and differential case configured as above, each notch portion is provided with the step surfaces on both sides of the notch central line along a direction recessed or curved from the inner peripheral surface of the ring gear. Therefore, not only when the rotational torque in the normal direction acts on the ring gear, but also when the rotational torque in the reverse direction opposite to the normal direction acts on the ring gear, it is possible to prevent the generation of rattle or looseness in a circumferential direction of the ring gear.

In the fastening structure for ring gear and differential case configured as above, the recess is formed on the step surfaces to be concave on the opposite side to the flange portion. Thus, when the flange portion is caulked to the notch portions, a part of caulking load acting on the step surfaces is released in the recess. According to the fastening structure for ring gear and differential case configured as above, for example, even when the caulking load exceeds a set value during caulking work, the caulking load acting on the step surfaces is reduced and thus deformation of the notch portions can be prevented.

REFERENCE SIGNS LIST

1 Fastening structure for ring gear and differential case
2 Differential case
3 Ring gear
4 Gear section
5 Notch portion
6 Press-fit surface
8 Flange portion
14, 15 Step surface
16 Recess

MODE FOR CARRYING OUT THE INVENTION

A detailed description of a preferred embodiment of a fastening structure for ring gear and differential case and a differential device using the fastening structure embodying the present invention will now be given referring to the accompanying drawings.

<Fastening Structure for Ring Gear and Differential Case>

Figure 1:
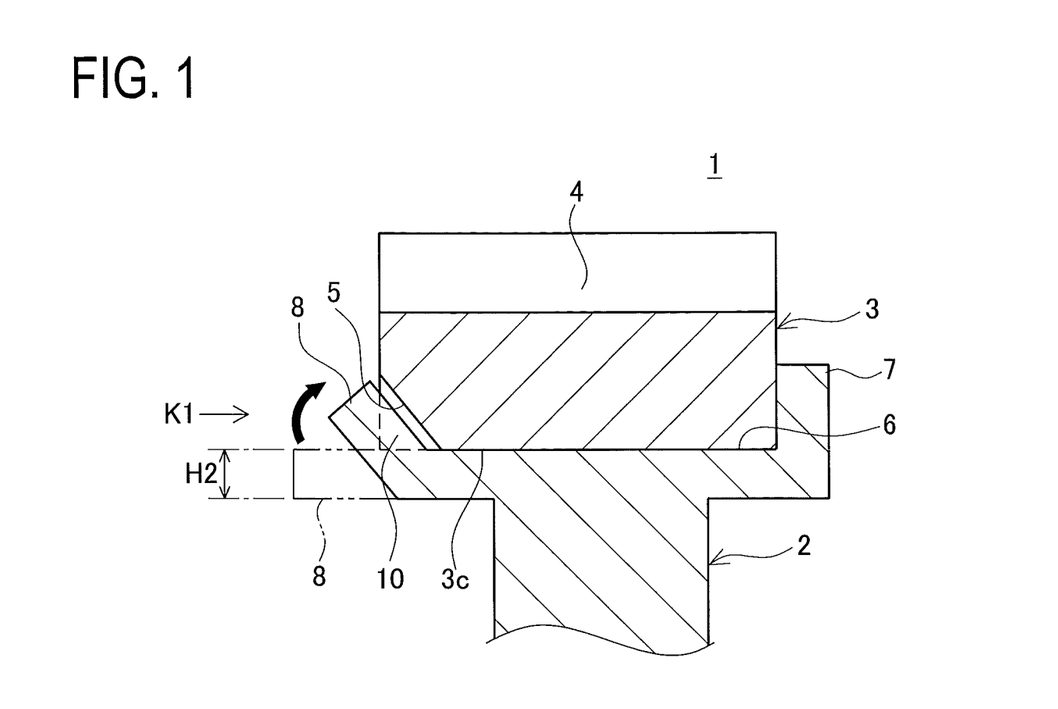
FIG. 1 is a schematic view of a fastening structure for ring gear and differential case in a first embodiment of the invention.
Figure 2:
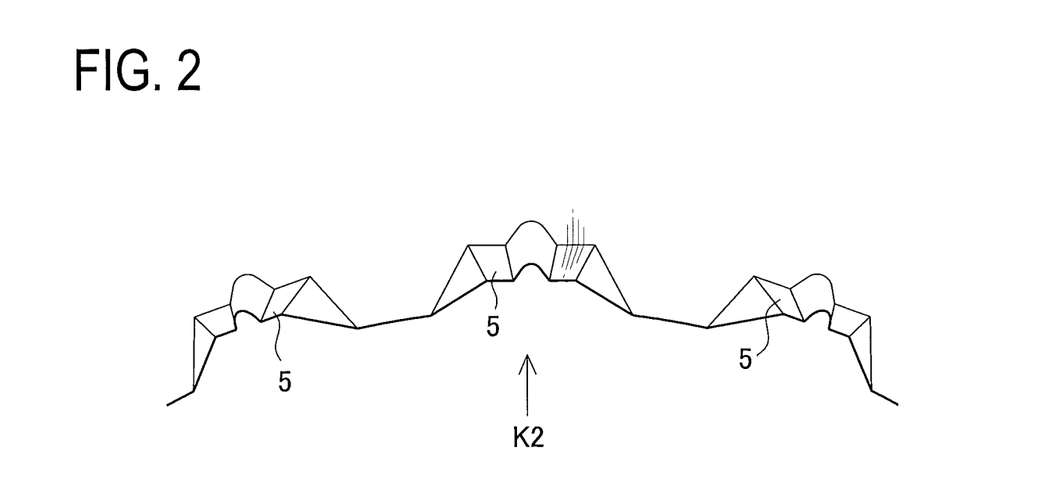
FIG. 2 is a partial enlarged view of an inner peripheral surface of the ring gear seen from a direction K1 in FIG. 1.

FIG. 1 is a schematic view of a fastening structure 1 for a ring gear 3 and a differential case 2 (hereinafter, referred to as a "fastening structure 1") in a first embodiment of the invention. FIG. 2 is a partial enlarged view of an inner peripheral surface 3c of the ring gear 3 seen from a direction K1 in FIG. 1. The fastening structure 1 in the present embodiment shown in FIG. 1 is applied to the differential gear 101 (one example of a differential device) for a vehicle, as in the conventional art. The differential gear 101 is installed in a vehicle so that the ring gear 3 meshes with a drive gear (not shown) for transmitting drive power to the gear 3. The fastening structure 1 is identical in configuration to the differential gear 101 excepting the ring gear 3 and the differential case 2. Thus, the following explanation is made with a focus on the ring gear 3 and the differential case 2.

The differential case 2 shown in FIG. 1 is made of cast iron easy to cause plastic flow. The differential case 2 is provided with a press-fit surface 6, a heel portion 7, and a flange portion 8 as with the conventional differential case 102 shown in FIG. 10 provided with the press-fit surface 106, the heel portion 107, and the flange portion 108. The press-fit surface 6 is provided annularly on an outer peripheral surface of the differential case 2 so as to be coaxial with the differential case 2. The heel portion 7 is provided annularly on the outside of a right end face of the press-fit surface 6 to restrict a press-fit amount of the ring gear 3 with respect to the differential case 2. The heel portion 7 is formed vertical to the press-fit surface 6. Further, the flange portion 8 is provided extending from a left end face of the press-fit surface 6 in the figure. This flange portion 8 is formed with a thickness to allow deformation. Those press-fit surface 6, heel portion 7, and flange portion 8 are made by cutting.

The ring gear 3 shown in FIG. 1 is made of low-carbon steel. The surface of the ring gear 3 is subjected to carburizing process to enhance hardness. The ring gear 3 has approximately a cylindrical shape in which the inner diameter of the inner peripheral surface 3c is smaller than the outer diameter of the press-fit surface 6 of the differential case 2 so that the ring gear 3 be press-fitted on the annular press-fit surface 6. The press-fit surface 6 is provided to be coaxial with an axis of the differential case 2. The ring gear 3 is formed, on the outer periphery thereof, with a gear section 4 to receive a rotational torque from an external device. The ring gear 3 is also formed, in the inner peripheral surface 3c thereof, with a plurality of notch portions 5 to which the flange portion 8 of the differential case 2 is caulked. The notch portions 5 are each slanted from a side of a left open end of the inner peripheral surface 3c to an inner side in the axial direction (rightward in the figure) so that the flange portion 8 is folded and uniformly caulked to the notch portions 5. As shown in FIG. 2, the notch portions 5 are arranged continuously along the inner peripheral surface 3c of the ring gear 3.

Figure 3:
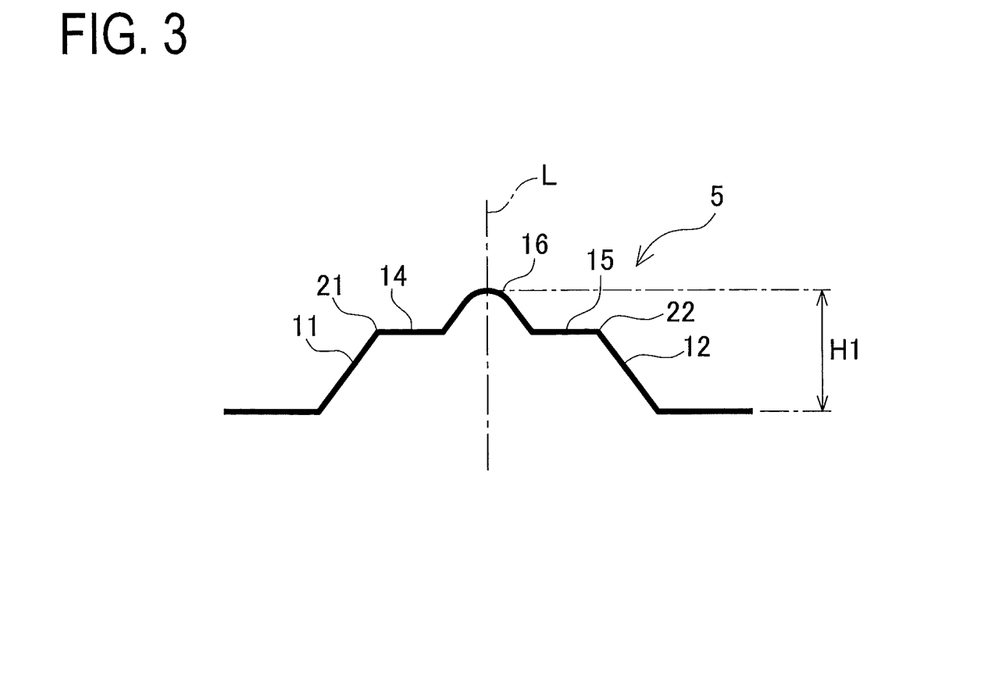
FIG. 3 is a diagram showing the shape of a notch portion seen from a direction K2 in FIG. 2.

FIG. 3 is a diagram showing the shape of each notch portion 5 seen from a direction K2 in FIG. 2. The notch portion 5 has approximately a chevron shape and includes slant surfaces 11 and 12 on both sides of a notch central line L along a direction recessed from the inner peripheral surface 3c. The notch portion 5 is formed with step surfaces 14 and 15 on both sides of the central line L. On the central line L of the notch portion 5, a recess 16 is formed. The notch portion 5 is provided with the slant surfaces 11 and 12 and the step surfaces 14 and 15 so that they are symmetric right and left with respect to the recess 16 in the figure. The step surfaces 14 and 15 are formed to be flat respectively between the slant surface 11 and the recess 16 and between the slant surface 12 and the recess 16. Accordingly, a shoulder 21 is formed between the slant surface 11 and the step surface 14, while a shoulder 22 is formed between the slant surface 12 and the step surface 15. The recess 16 is provided to be concave upward between the step surfaces 14 and 15 (on an opposite side from the flange portion 8 of the differential case 2) in the figure. Each of the notch portions 5 configured as above is designed so that a total height H1 is shorter than the thickness H2 of the flange portion 8 in a radial direction to allow caulking of the flange portion 8 thereto. The notch portions 5 are formed by forging to provide hardness higher than the flange portion 8 of the differential case 2.

<Method of Fastening Differential Case and Ring Gear>

The ring gear 3 is press-fitted onto the press-fit surface 6 from the side of the flange portion 8 of the differential case 2 until the ring gear 3 abuts on the heel portion 7. At that time, the ring gear 3 is press-fitted to the differential case 2 in such a way that the notch portions 5 are located on an opposite side from the heel portion 7. The flange portion 8 is folded toward the ring gear 3 and strongly pressed against the notch portions 5. When the flange portion 8, lower in hardness than the notch portions 5, is pressed against the notch portions 5, the flange portion 8 is plastically deformed to fill in the notch portions 5 and caulked thereto. Thus, the ring gear 3 is positioned coaxially with respect to the differential case 2 through the press-fit portion with the press-fit surface 6. The ring gear 3 is further placed between the caulking portion of the flange portion 8 to the notch portions 5 and the heel portion 7 and held in position in an axis direction with respect to the differential case 2.

Figure 4:
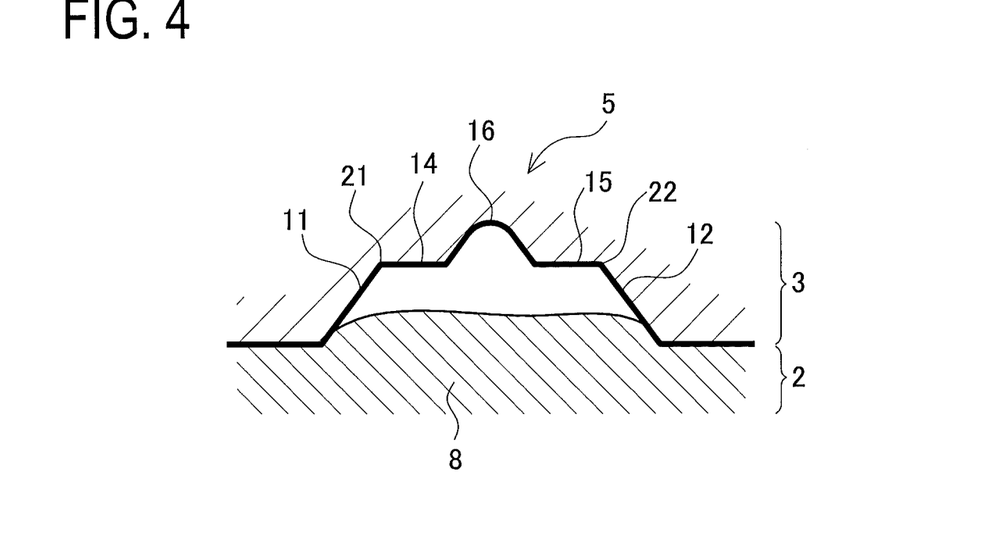
FIG. 4 is a diagram to explain a caulking process, showing a state where a material starts to fill in a notch portion.
Figure 5:
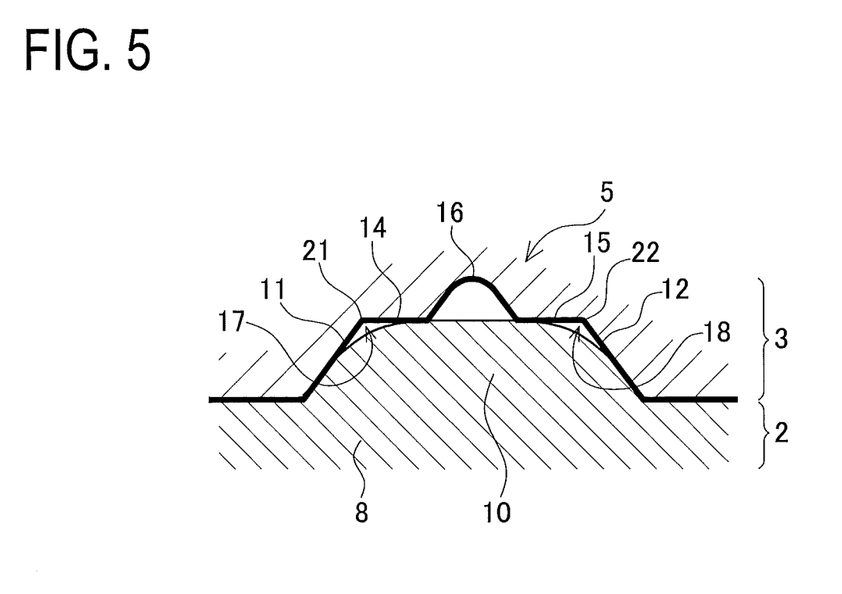
FIG. 5 is a diagram to explain the caulking process, showing a state where the material fills in the notch portion.
Figure 6:
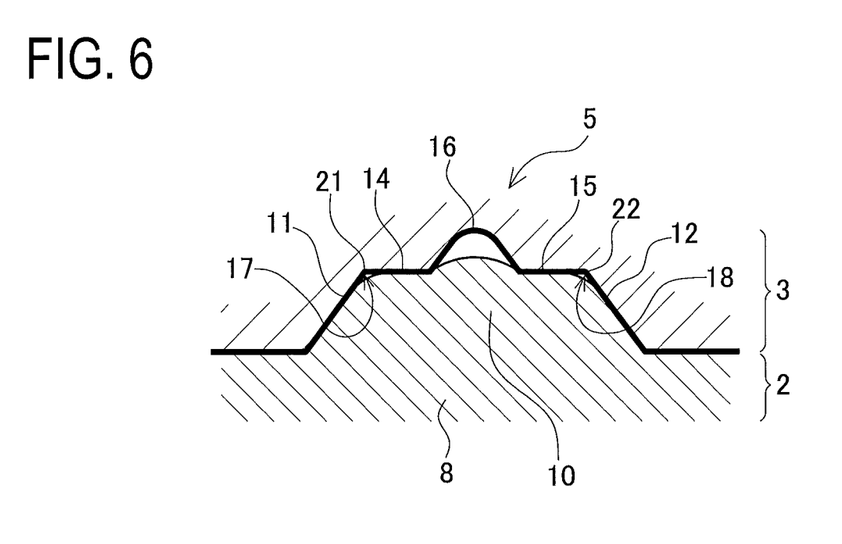
FIG. 6 is a diagram to explain the caulking process, showing a state where a caulking load is reduced.

The caulking process will be explained in more detail below. FIG. 4 is a diagram to explain the caulking process, showing a state where the material starts to fill in the notch portions 5. FIG. 5 is a diagram to explain the caulking process, showing a state where the material fills in the notch portions 5. FIG. 6 is a diagram to explain the caulking process, showing a state where a caulking load is reduced. Arrows in the figures described in the flange portion 8 represent plastic flow directions of the material.

When the flange portion 8 is pressed against the notch portions 5, the material of the flange portion 8 plastically flows to enter the notch portion 5 as shown in FIG. 4, and thus the flange portion 8 is deformed. At that time, the material of the flange portion 8 is guided along the slant surfaces 11 and 12 symmetrically provided in the notch portion 5, and is deformed to rise up toward the recess 16, so that the material reaches the step surfaces 14 and 15 as shown in FIG. 5. As soon as the material touches the step surfaces 14 and 15, it starts to plastically flow so as to expand rightward and leftward in the figure along the step surfaces 14 and 15. Accordingly, unfilled areas 17 and 18 generated inside the shoulders 21 and 22 get filled with the material of the flange portion 8. Accordingly, in each of the notch portions 5, the unfilled areas 17 and 18 in which the material of the flange portion 8 is not filled are reduced in size. Thus, the flange portion 8 is plastically deformed to fill up to the step surfaces 14 and 15 of each notch portion 5, thereby forming the caulking portion 10 caulked to the notch portions 5.

At this time, in some cases, for example, a caulking tool that folds the flange portion 8 toward the notch portions 5 does not meet the shape of the notch portions 5, so that the caulking load to caulk the flange portion 8 to the notch portions 5 may increase more than a set value. In this case, the notch portions 5 are each provided with the recess 16 recessed outward in a radial direction (upward in the figure) between the step surfaces 14 and 15 as shown in FIG. 6. Thus, the material of the flange portion 8 impinges on the step surfaces 14 and 15 and then releases part of the caulking load toward the recess 16, thereby reducing the caulking load acting on the step surfaces 14 and 15. In the fastening structure 1, therefore, even when the caulking load exceeds a set value in the caulking work, the deformation of the notch portions 5 can be prevented.

<Torque Transmission Method>

When the vehicle runs ahead, for example, the ring gear 3 in the fastening structure 1 is rotated in the normal direction by the drive gear not shown. The rotational torque in the normal direction acting on the ring gear 3 is transmitted to the differential case 2 via the caulking portion 10 of the flange portion 8 caulked to the notch portions 5 and the press-fit portion of the ring gear 3 fitted on the press-fit surface 6. Thus, the differential case 2 is rotated together with the ring gear 3. The differential gear 101 transmits the rotation of the differential case 2 to the axle 120 via the pinion gear 119 and the differential gear 116 and absorbs a speed difference between an inner wheel and an outer wheel of the vehicle.

When the vehicle runs back, for example, the ring gear 3 in the fastening structure 1 is rotated by the drive gear not shown in a reverse direction opposite to the normal direction. The rotational torque in the reverse direction acting on the ring gear 3 is transmitted to the differential case 2 in a similar manner to the above.

Figure 7:
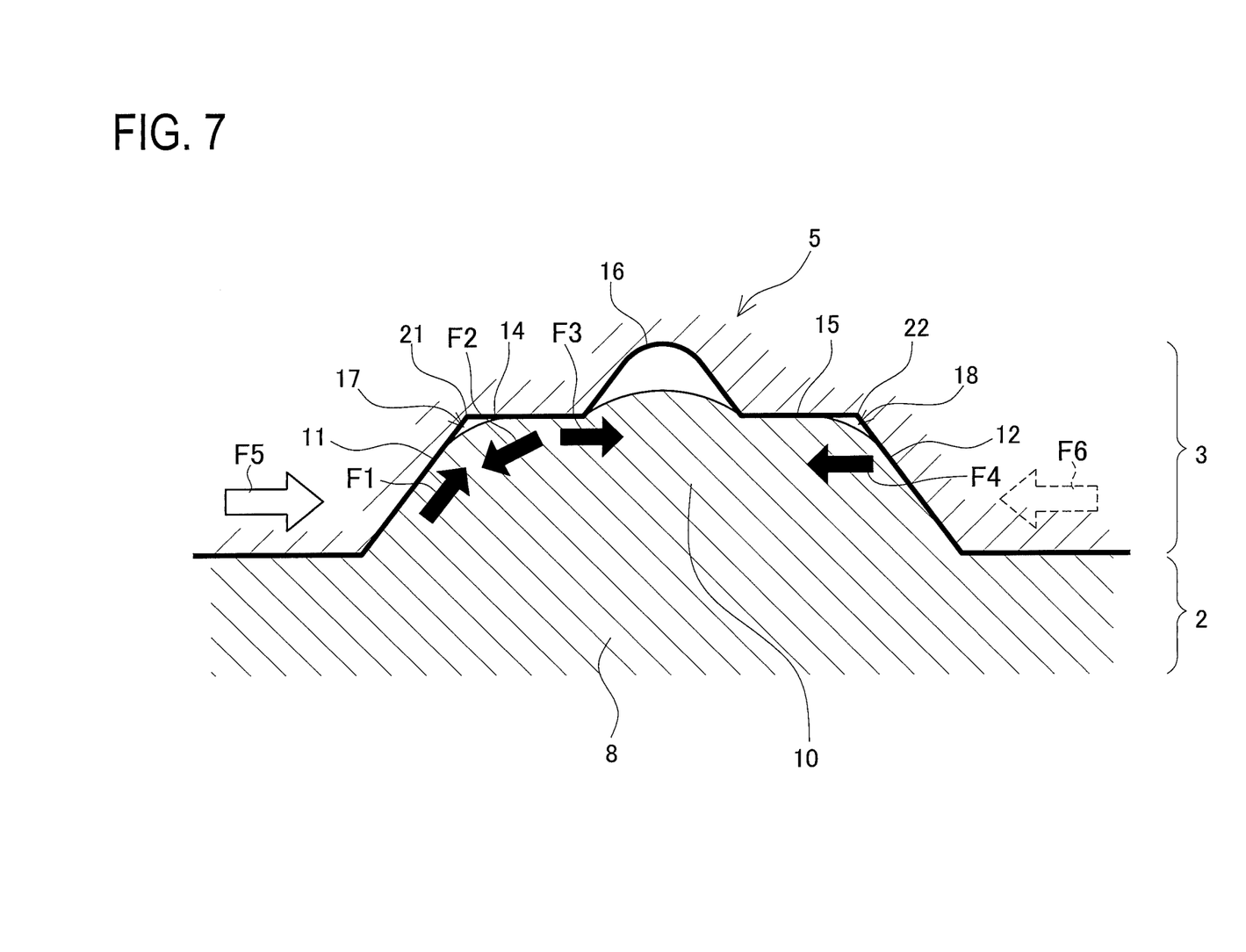
FIG. 7 is a diagram to explain a torque transmission state in which a rotational torque in a normal direction is transmitted from the ring gear to the differential case.

Deformation of the caulking portion 10 while the torque acts on the notch portions 5 will be explained below. FIG. 7 is a diagram to explain a torque transmission state in which the rotational torque in the normal direction is transmitted from the ring gear 3 to the differential case 2.

For instance, during forward running of the vehicle, when a rotational torque F5 in the normal direction acts on the slant surface 11 of the notch portion 5, the caulking portion 10 is pressed by the slant surface 11 and forced to plastically deform. However, the caulking portion 10 is caulked to the notch portions 5 as contacting the slant surface 11, step surface 14, step surface 15, and slant surface 12 with the unfilled areas 17 and 18 reduced. The rotational torque acting on the slant surface 11 is therefore converted into a force directed to the upper right in the figure, as indicated by F1 in the figure, toward the unfilled area[[s]] 17 and 18 and the recess 16 which are not yet filled with the material and thus low in strength, and acts on the step surface 14. The step surface 14 generates a reactive force as shown by F2 in the figure against the force F1 in the figure to prevent deformation of the caulking portion 10. The reactive force F2 has no escape route and thus is converted into a force F3 directed to the right in the figure toward the slant surface 12 opposite from the slant surface 11. However, the caulking portion 10 is also in contact with the slant surface 12. Accordingly, when the force F3 acts on the slant surface 12, a reactive force F4 directed to the left in the figure is generated, preventing deformation of the caulking portion 10. At that time, the caulking portion 10 is also in contact with the step surface 15 and thereby restricted from deformation. Consequently, the caulking portion 10 is subjected to the force close to a hydrostatic pressure during forward running of the vehicle and thus is not deformed, generating no gaps between the caulking portion 10 and the notch portions 5. When the rotational torque F5 in the normal direction acts on the ring gear 3 to rotate the ring gear 3 and the differential case 2 in the normal direction, the fastening structure 1 can prevent the generation of rattle or looseness in the circumferential direction of the ring gear 3.

On the other hand, when the rotational torque F6 in the reverse direction opposite to the rotational torque F5 in the normal direction is exerted on the notch portions 5 during backward running of the vehicle, the caulking portion 10 is pressed by the slant surface 12 and forced to plastically deform. However, because the caulking portion 10 is in contact with the step surfaces 14 and 15, the direction of the rotational torque F6 acting on the slant surface 12 is converted as in the case where the rotational torque F5 in the normal direction acts on the slant surface 11 as mentioned above, plastic deformation of the caulking portion 10 is restrained by the step surfaces 14 and 15 and the slant surface 11. Consequently, the caulking portion 10 subjected to the force close to a hydrostatic pressure while the vehicle runs back is not deformed, so that no gaps are generated between the caulking portion 10 and the notch portions 5. Accordingly, when the rotational torque F6 in the reverse direction acts on the ring gear 3 and thus the ring gear 3 and the differential case 2 are rotated in the reverse direction, the fastening structure 1 can prevent generation of rattle or looseness in the circumferential direction of the ring gear 3.

The notch portions 5 are each provided with the slant surfaces 11 and 12 and the step surfaces 14 and 15 in a right and left symmetric shape with respect to the notch central line L. During backward running of the vehicle, for instance, even when the rotational torque F6 in the reverse direction acts on the notch portions 5 at the same degree as the rotational torque F5 applied during the forward running, it is possible to restrain the plastic deformation of the caulking portion 10 and prevent the generation of rattle or looseness in the circumferential direction of the ring gear 3.

In the fastening structure 1, no gaps are generated between the caulking portion 10 and the notch portions 5 during forward running and during backward running of a vehicle. Therefore, even when the vehicle repeats forward running and backward running, the caulking portion 10 and the notch portions 5 will not repeat mutual impinging or colliding leading to increased rattle or looseness.

Since the differential gear 101 incorporating the fastening structure 1 can prevent the generation of rattle of the ring gear 3, the engagement position of the gear section 4 of the ring gear 3 with the drive gear not shown is less likely to be displaced during torque transmission. Accordingly, the gear section 4 smoothly meshes with the drive gear not shown, providing an additional effect that is less likely to generate gear noise. Furthermore, the differential gear 101 keeps the gear section 4 in normal meshing engagement with the drive gear not shown, so that no biased force acts on the tooth surface of the gear section 4. This provides an additional effect that the tooth surface strength of the gear section 4 is hard to deteriorate.

Since the differential gear 101 incorporating the fastening structure 1 can restrain the generation of rattle or looseness between the ring gear 3 and the differential case 2,the ring gear 3 is not rotated with respect to the differential case 2 to eliminate the gaps generated between the notch portions 5 and the caulking portion 10. This makes it possible to prevent the inner peripheral surface of the ring gear 3 from sliding or slipping with respect to the press-fit surface 6 of the differential case 2 and thus avoid plastic deformation of the press-fit surface 6. Thus, the foreign matters resulting from friction between the ring gear 3 and the press-fit surface 6 are not generated. The fastening strength between the ring gear 3 and the press-fit surface 6 does not deteriorate, which is accompanied by the effect that can maintain the durability of the differential gear 101 for a long term.

<Modified Example>

The present invention is not limited to the above embodiment and may be embodied in other specific forms without departing from the essential characteristics thereof.

For instance, in the above embodiment, the recess 16 is provided at the upper center of each notch portion 5. As an alternative, the recess 16 may be provided in a position displaced from the center toward either the shoulder 21 or the shoulder 22.

In the above embodiment, for example, the slant surfaces 11 and 12 and the step surfaces 14 and 15 are provided to be symmetric right and left with respect to the recess 16, but the slant surfaces 11 and 12 and the step surfaces 14 and 15 may be provided to be not symmetric right and left. To be concrete, only the step surface 14 may be provided or the step surface 15 may be provided with a smaller width than the step surface 14.

In the above embodiment, for example, the step surfaces 14 and 15 are flat, but may be slanted gently with a smaller slant angle than the slant surfaces 11 and 12.

In the above embodiment, for example, each notch portion 5 is provided with the recess 16, but does not have to be provided with the recess 16 as long as the notch portions 5 can be prevented from deforming even when excessive caulking load exceeding the set value acts on the notch portions 5. Specifically, for example, the notch portions 5 may be formed to be trapezoidal in cross section.

The invention claimed is:

1. A fastening structure for ring gear and differential case, including:
    a ring gear having an outer peripheral surface formed with a gear section and an inner peripheral surface formed with a plurality of notch portions recessed from the inner peripheral surface;
    a differential case including a press-fit surface on which the ring gear is press-fitted and a flange portion formed at an end of the press-fit surface and pressed against the notch portions,
    the ring gear is press-fitted on the press-fit surface and then the flange portion is pressed against the notch portions to fasten the differential case to the ring gear by caulking,
    wherein the notch portions each have:
        at least two step surfaces that are flat,
        at least two slant surfaces formed to be slanted toward a notch central line of each of the notch portions in a direction recessed from the inner peripheral surface, wherein each of the slant surfaces is located between one of the step surfaces and the inner peripheral surface, and
        at least two shoulders, wherein each of the shoulders is formed between one of the step surfaces and one of the slant surfaces, and
    the notch portions are each formed with a recess on the step surfaces so that the recess is concave on an opposite side from the flange portion to release part of caulking load acting on the step surfaces into the recess.

2. The fastening structure for ring gear and differential case according to claim 1, wherein the step surfaces of each of the notch portions are provided on both sides of the notch central line.

3. A differential device incorporating the fastening structure for ring gear and differential case according to claim 1.

4. A differential device incorporating the fastening structure for ring gear and differential case according to claim 2.

* * * * *